March 11, 1958     F. H. SPEDDING ET AL     2,826,495
ALLOY FOR USE IN NUCLEAR FISSION Filed July 17, 1946     3 Sheets-Sheet 1

Inventors:
Frank H. Spedding
Harley A. Wilhelm
By Robert G. Lavender
Attorney

March 11, 1958  F. H. SPEDDING ET AL  2,826,495
ALLOY FOR USE IN NUCLEAR FISSION
Filed July 17, 1946  3 Sheets-Sheet 2

Witnesses:
Herbert E. Metcalf
Walter J. Schlegel, Jr.

Inventors:
Frank H. Spedding
Harley A. Wilhelm
By: Robert A. Lavender
Attorney

March 11, 1958     F. H. SPEDDING ET AL     2,826,495
ALLOY FOR USE IN NUCLEAR FISSION
Filed July 17, 1946     3 Sheets-Sheet 3
FIG.3.
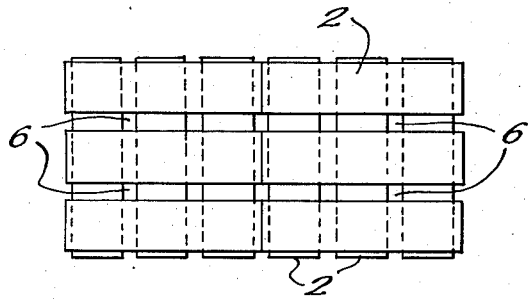
FIG.5.
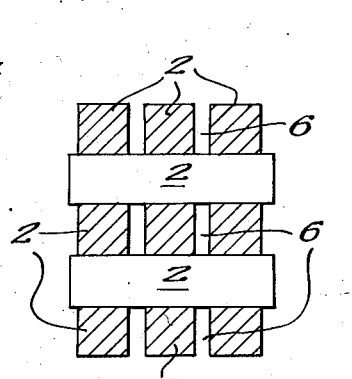
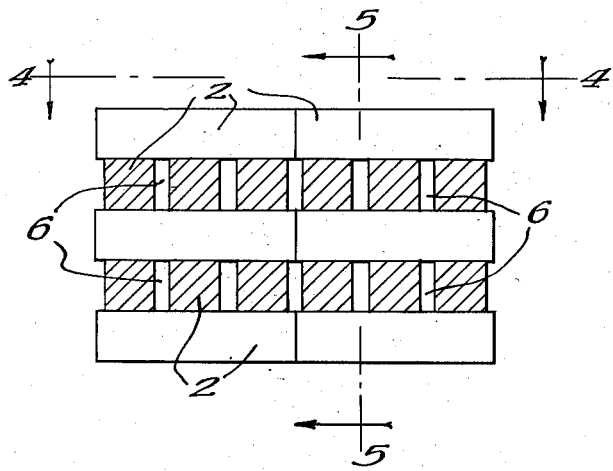
FIG.4.
Witnesses:
Herbert E. Metcalf
Walter S. Schlegel, Jr.
Inventors:
Frank H. Spedding
Harley A. Wilhelm
By: Robert A. Lavender
Attorney 2,826,495

ALLOY FOR USE IN NUCLEAR FISSION

Frank H. Spedding and Harley A. Wilhelm, Ames, Iowa, assignors to the United States of America as represented by the United States Atomic Energy Commission Application July 17, 1946, Serial No. 684,117

1 Claim. (Cl. 75—122.7)

The present invention relates to the general subject of nuclear fission, and particularly to the establishment of a self-sustaining neutron chain fission reaction in a novel reactive composition.

Experiments by Hahn and Strassman, the results of which were published in January 1939, led to the conclusion that nuclear bombardment of natural uranium by slow neutrons causes explosion or fission of the nucleus, which splits into particles of smaller charge and mass with energy being released in the process. Later it was found that neutrons were emitted during the process and that the fission was principally confined to the uranium isotope $U^{235}$ present as about .71 percent of the natural uranium.

When it became known that isotope $U^{235}$ in natural uranium could be split or fissioned by bombardment with thermal neutrons, i. e., neutrons at or near thermal equilibrium with the surrounding medium, many predictions were made as to the possibility of obtaining a self-sustaining chain reaction system operating at high neutron densities. In such a system, the fission neutrons produced give rise to new fission neutrons in sufficiently large numbers to overcome the neutron losses in the system. Since the result of the fission of the uranium nucleus is the production of two lighter elements with great kinetic energy, plus approximately 2 fast neutrons on the average for each fission along with beta and gamma radiation, a large amount of power could be made available if a self-sustaining system could be built.

In order to attain such a self-sustaining chain reaction in a system of practical size, the ratio of the number of neutrons produced in one generation by the fissions to the number of neutrons causing the fission, must be known to be greater than unity after all neutron losses are deducted, and this ratio is, of course, dependent upon the values of the number of neutrons produced per fission and the number lost in the chain without producing fission.

The ratio of the fast neutrons produced in one generation by the fissions to the original number of fast neutrons in a theoretical system of infinite size where there can be no external loss of neutrons is called the reproduction or multiplication factor or constant of the system and is denoted by the symbol K. For any finite system, some neutrons will escape from the periphery of the system. Consequently, a system of finite size may be said to have a K constant, even though the value thereof would only exist if the system as built were extended to infinity without change of geometry or materials. Thus, when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, a self-sustaining chain-reacting system of finite and practical size can be built to produce power and related by-products by nuclear fission of natural uranium. The neutron reproduction ratio (r) in a system of finite size, therefore, differs from K by the external leakage factor, and by a factor due to the neutron absorption by localized neutron absorbers, and the reproduction ratio must still be sufficiently greater than unity to permit the neutron density to rise exponentially with time in the system as built.

In a self-sustaining chain reaction of uranium with slow neutrons, as presently understood, $92^{238}$ is converted by neutron capture to the isotope $92^{239}$. The latter is converted by beta decay to $93^{239}$ and this $93^{239}$ in turn is converted by beta decay to plutonium ($94^{239}$ or $Pu^{239}$). Other isotopes of 93 and 94 may be formed in small quantities. By slow or thermal neutron capture, $92^{235}$ on the other hand can undergo nuclear fission to release energy appearing as heat, gamma and beta radiation, together with the formation of fission fragments appearing as radioactive isotopes of elements of lower mass numbers, and with the release of secondary neutrons.

A self-sustaining chain reaction has heretofore been realized in systems where the fast neutrons emitted by the fission of $U^{235}$ in natural uranium are slowed to thermal or near thermal energies by a material known as a neutron moderator before causing additional fissions in $U^{235}$. Certain of such devices, known as slow neutronic reactors embody natural uranium disposed in an efficient neutron-energy moderator such as heavy water ($D_2O$), beryllium, and graphite. This slow-neutron reaction is fully described and claimed in the Fermi and Szilard application Serial No. 568,904, filed December 19, 1944, now Patent No. 2,708,656, issued May 17, 1955.

However, it has been found that reactive materials other than natural uranium can be used to support a chain reaction in much the same manner as in a natural-uranium structure. One such reactive material is an alloy composed of at least 0.7 percent by weight of fissionable material and the balance substantially pure beryllium which functions as a neutron moderator in the manner above described. This alloy may be assembled into a solid substantially homogeneous structure capable of producing a nuclear fission chain reaction.

If desired, thorium in any desired amount up to fifty percent by weight may be incorporated in the alloy to increase workability thereof by causing the alloy to crystallize on the cubic system, which is, in general, more malleable than the hexagonal type to which beryllium belongs. Furthermore, the thorium atoms absorb neutrons leading to the formation of $U^{233}$, a fissionable isotope, in accordance with the following isotope conversion sequence:

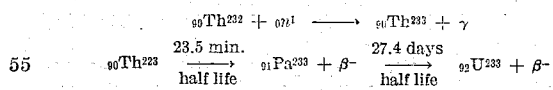

Thus, the thorium in the alloy not only increases the malleability thereof, but also undergoes nuclear reaction under neutron bombardment to produce additional fissionable material, thereby lengthening the life of the reactive structure.

The thermally fissionable isotope to be originally incorporated in the alloy may be $U^{233}$, $U^{235}$ or $94^{239}$, or mixtures thereof; and the uranium isotopes are preferably combined with the beryllium as a uranium-beryllium alloy, which may contain, as above noted, a quantity of thorium.

A general object of the invention is to provide a novel neutronically reactive composition which may be utilized for the purpose of producing power and for irradiating material to produce reactive isotopes, as more fully discussed in the above-mentioned copending application.

Another object of the invention is to provide a solid homogeneous reactive composition capable of sustaining a chain reaction.

Another object of the invention is to provide a neutronically reactive composition in which a metallic neutron moderator is alloyed with a fissionable isotope or isotopes.

Still another object of the invention is to provide a novel method and means for producing a nuclear fission chain reaction by alloying a metallic neutronic moderator, such as beryllium, with a fissionable isotope, such as $U^{235}$, and then assembling masses of the alloy into a structure having a neutron reproduction ratio greater than unity.

Still another object of the invention is to produce a novel alloy containing uranium or plutonium and beryllium.

The foregoing and other objects and advantages of the present invention will be more readily understood by reference to the following specification and the accompanying drawings, wherein.

Figures 1, 6:
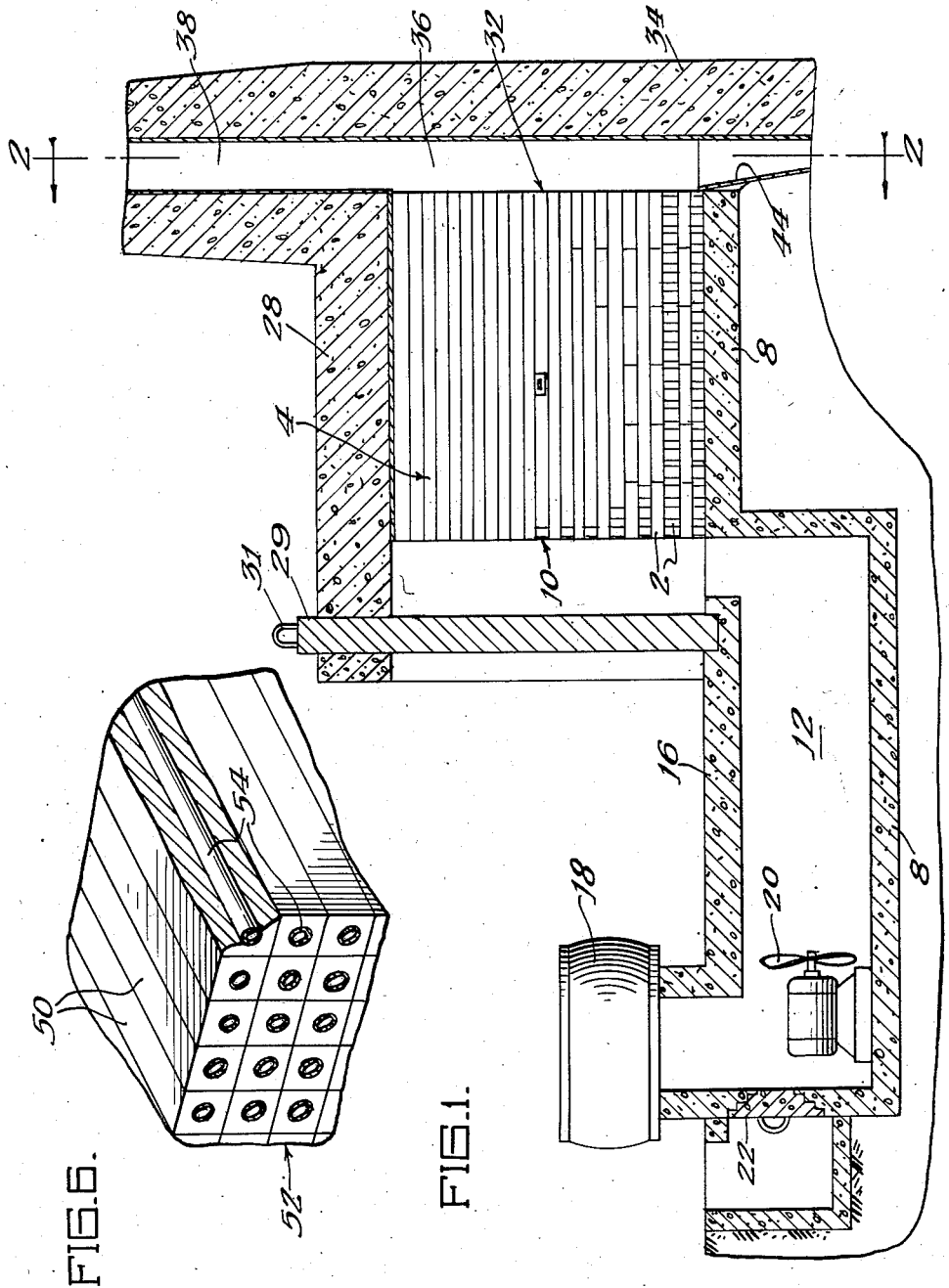
Fig. 1 is a diagrammatic longitudinal sectional view, partly in elevation, taken on a vertical plane approximately bisecting a reaction system embodying the invention.
Figure 2:
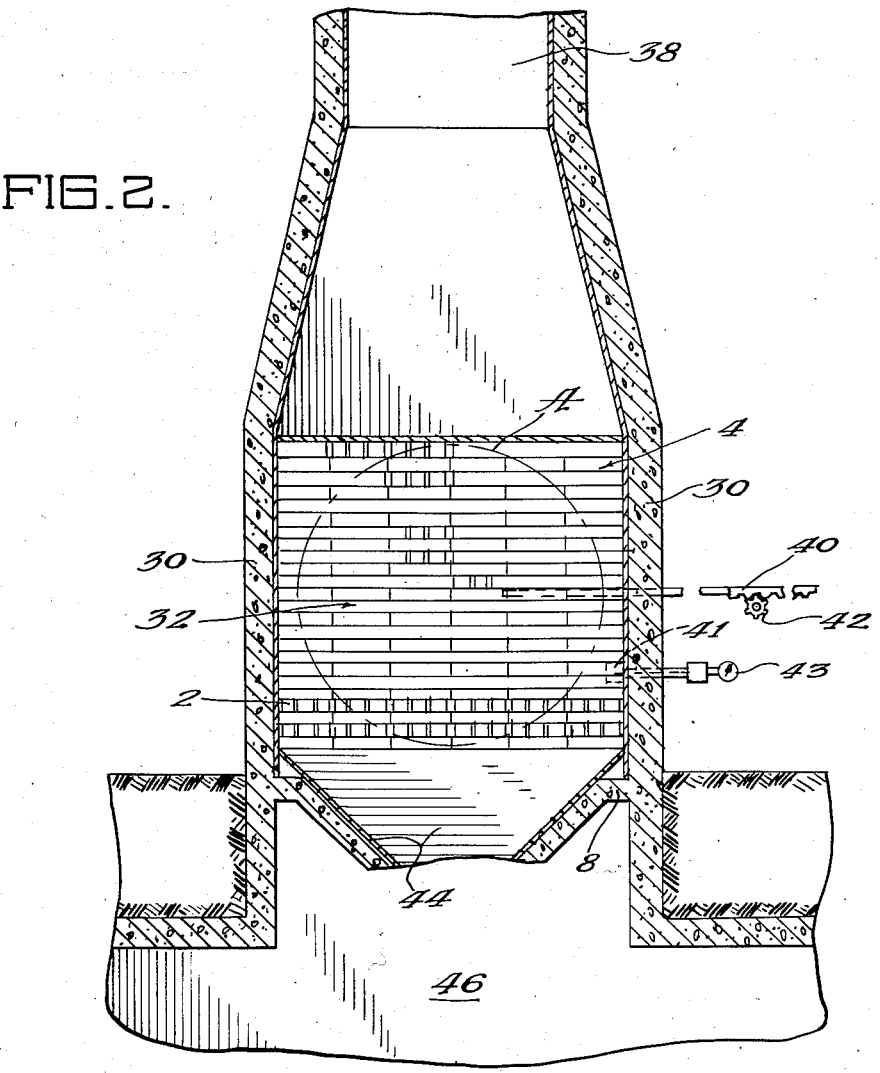
Fig. 2 is a diagrammatic cross-sectional view taken on a transverse vertical plane indicated by the line 2—2 of Fig. 1, portions of the structure being shown in elevation to clarify the illustration.

Figs. 3 to 5, inclusive, illustrate in enlarged detail the neutronically reactive structure utilized in Figs. 1 and 2, Fig. 3 being a fragmentary top plane view of the reactive structure, Fig. 4 being a sectional view taken in a transverse vertical plane indicated by the line 4—4 of Fig. 3, and Fig. 5 being a fragmentary side elevation of the structure; and Fig. 6 is an enlarged fragmentary perspective view, partly in section, illustrating a modified form of reactive composition constructed according to the invention.

Describing the invention in detail and referring first to the embodiment thereof illustrated in Figs. 1 to 5, inclusive, the system comprises a neutronic reactor consisting of a mass of alloy metal blocks or bricks 2 loosely piled or stacked into a cube generally designated 4 (Figs. 1 and 2). The cube 4 is provided with a plurality of air channels defined by interstices 6 between the blocks 2, and is supported on a concrete foundation 8.

Adjacent and below the air inlet face 10 of the cube 4, the foundation 8 is continued downwardly and then horizontally to form a floor which together with side and top walls 16 form an air duct 12. At some distance away from the cube 4, the duct 12 is turned upwardly and terminates in an air filter 18 relatively close to the surface of the ground. A fan or blower 20, here illustrated as electrically driven, is installed on the floor of the inlet duct 12 just below the air filter, access to the fan being conveniently obtained through a duct door 22 behind the fan.

Above the cube 4 is a concrete top shield 28 and side walls 30 of concrete are built up from foundation 8. The shields 28 and 30 closely approach the top and side faces of the cube to minimize air flow therearound, although a small amount of air circulation may be desirable to cool the top and side faces of the cube. A lead shield 29 extends through a complementary opening in the wall 28 and is supported by the walls 16, said shield being adapted to protect operating personnel from radioactive emanations from the front or inlet face 10 of the cube 4. The top of shield 29 is provided with an eye or loop 31 adapted for connection to an associated hoist (not shown), whereby the shield 29 may be raised and lowered, as desired. At the air outlet face 32 of the cube 4, an outlet end shield 34 is provided, said shield being parallel to and spaced from the outlet face 32 to form an outlet chamber 36 communicating with a stack 38 projecting upwardly and formed as a continuation of the concrete top, side and outlet end shields. Thus the cube 4 is completely enclosed by shields with a duct system operating by pressure provided by fan 20 to conduct cooling air from close to ground level through the air passages or interstices 6 into the stack 38, and thence into the atmosphere well above ground level at the top of the stack.

It will be understood that a chain reaction takes place within the cube 4 by fissioning of the fissionable material within the blocks 2, the beryllium content thereof functioning as neutron moderator to slow the neutrons to energy levels ranging between resonance and thermal energies, at which values they are most effective to cause fission of the above-mentioned fissionable isotopes. If desired, the blocks 2 within a roughly cylindrical area indicated at A, Fig. 2, may be formed of the above-mentioned uranium-beryllium alloy to define a reactive structure, and the blocks 2 externally of the area A may be formed of a suitable neutron-reflecting material, such as graphite, to afford a neutron reflector about the reactive structure A, thereby diminishing neutron losses from the periphery thereof, as is more fully discussed in the above-mentioned copending application.

The neutron density within the cube 4 may be controlled by a control rod 40 diagrammatically illustrated in Fig. 2, said density being indicated by means of an ionization chamber 41 and a meter 43. The rod 40 extends into the cube 4, sliding through certain of the interstices 6 therein, and is operated from outside the adjacent shield 30 by a rack and pinion mechanism 42, said rod being constructed of an efficient neutron absorber, such as cadmium or boron, in order to control the neutron reproduction ratio of the system, as is more fully described in the above-mentioned copending application.

It is to be understood that the shield 29 may be elevated to accommodate construction of the cube 4, which during the construction thereof is rendered incapable of sustaining a chain reaction by neutron absorbers, such as rod 40, inserted into the cube. After the cube has been constructed, the shield 29 may be lowered to the position illustrated in Fig. 1 and the neutron absorbers may be removed to permit the neutron reproduction ratio of the system to be regulated within a range above and below unity by means of the above-mentioned control rod 40. When it becomes desirable to disassemble the cube 4, the chain reaction therein may be stopped, and the shield 29 may be elevated to permit the blocks 2 to be pushed by any suitable means (not shown) into the outlet chamber 36 from which they fall through a funnel-like baffle 44 into a discharge chamber 46 (Fig. 2) from which the blocks 2 are removed by conveyer means (not shown).

The blocks 2 are formed of an alloy such as above described. While the invention broadly comprehends an alloy of fissionable material and beryllium and optionally a quantity of thorium up to 50 percent by weight, it has been found that reactor structures of relatively small critical size (i. e., the size at which a chain reaction may be sustained) may be constructed of an alloy containing beryllium, $U^{238}$, and fissionable material such as $U^{233}$, $U^{235}$, or $Pu^{239}$ or combination thereof in concentration above about 0.7 percent by weight based upon the weight of $U^{238}$ in the alloy. Another alloy which may be utilized in the construction of small size reactors contains at least 0.7 percent by weight of fissionable material and the balance substantially neutronically pure beryllium. In either of the above-described alloys, thorium up to 50 percent by weight may be added for the purposes heretofore described.

The alloy may be produced in any desired manner, preferably by reducing the fluorides of the various metals within a reduction bomb containing a suitable catalyst, as is more fully described in copending application, U. S. Serial No. 640,104, filed January 9, 1946.

In Fig. 6 is shown a modified reactive composition structure formed in accordance with the teachings of the present invention. Elongated bars 50 of the same alloy of which the blocks 2 are formed are stacked in contiguous relationship to form a cube 52 similar to the cube 4. Each bar 50 has a conduit 54 extending longitudinally therethrough which receives a coolant fluid. The cube 52 is disposed in a system similar to that described above and shown in Figs. 1–5 in connection with the cube 4.

While the theory of nuclear fission chain reactions set forth herein is based on the best presently known experimental evidence, the invention is not limited thereto inasmuch as additional experimental data later discovered may modify the theory disclosed.

What is claimed is:

A fuel material for neutronic reactors consisting of an alloy containing at least 0.7 percent by weight of $U^{235}$, thorium in an amount sufficient to give substantially increased workability of the alloy and a maximum amount of 50 percent by weight of the alloy, and the balance being beryllium.

References Cited in the file of this patent

UNITED STATES PATENTS

| | | |
|---|---|---|
| 2,025,616 | Rohn | Dec. 24, 1935 |
| 2,526,805 | Carter et al. | Oct. 24, 1950 |
| 2,574,627 | Daane et al. | Nov. 13, 1951 |
| 2,692,823 | Cieslicki et al. | Oct. 26, 1954 |
| 2,708,656 | Fermi et al. | May 17, 1955 |

FOREIGN PATENTS

| | | |
|---|---|---|
| 114,150 | Australia | May 2, 1940 |
| 233,011 | Switzerland | Oct. 2, 1944 |

OTHER REFERENCES

Pollard and Davidson: "Applied Nuclear Physics," page 225, John Wiley & Sons, Inc. (1942).

Smyth: "Methods of Using Atomic Energy for Military Purposes," August 1945, page 75.

Kelly et al.: Phy. Rev. 73, 1135–9 (1948).